(12) United States Patent
Balka

(10) Patent No.: US 11,747,098 B2
(45) Date of Patent: Sep. 5, 2023

(54) TEMPERATURE CONTROL APPARATUS

(71) Applicant: ENGEL AUSTRIA GmbH, Schwertberg (AT)

(72) Inventor: Christoph Balka, Perchtoldsdorf (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 534 days.

(21) Appl. No.: 15/361,177

(22) Filed: Nov. 25, 2016

(65) Prior Publication Data

US 2017/0153074 A1    Jun. 1, 2017

(30) Foreign Application Priority Data

Nov. 27, 2015  (AT) .............................. A 51020/2015

(51) Int. Cl.
*F28F 27/02*     (2006.01)
*B29C 35/00*     (2006.01)
(Continued)

(52) U.S. Cl.
CPC ............. *F28F 27/02* (2013.01); *B29C 35/007* (2013.01); *B29C 45/72* (2013.01);
(Continued)

(58) Field of Classification Search
CPC ........ F28F 27/02; B29C 35/007; B29C 45/72; B29C 45/78; B29C 45/7306
See application file for complete search history.

(56) References Cited

U.S. PATENT DOCUMENTS 4,902,454 A * 2/1990 Steinbichler ........ B29C 45/7306
                                                        264/328.16
4,982,068 A * 1/1991 Pollock ................... B29C 33/04
                                                        392/488
(Continued)

FOREIGN PATENT DOCUMENTS

DE     2416755 A1 * 9/1979 ......... B22D 17/2218
DE     8712481         1/1988
(Continued)

OTHER PUBLICATIONS

European Search Report dated Apr. 4, 2017 in corresponding European Application No. 16 19 9594, with English translation.
(Continued)

*Primary Examiner* — Jianying C Atkisson
*Assistant Examiner* — For K Ling
(74) *Attorney, Agent, or Firm* — WENDEROTH, LIND & PONACK, L.L.P.

(57) ABSTRACT

A temperature control apparatus includes a temperature control branch connected to a feed line for a temperature control medium, a pump system including a pump for conveying the medium, a pump open-loop or closed-loop control device for controlling the output of the pump system, a throttle device having a variable degree of opening for throttling a quantitative through-flow of the medium in the temperature control branch, and an open-loop or closed-loop control device with the degree of opening of the throttle device as a setting value and with a control variable from the group: degree of opening of the throttle device, temperature, temperature difference, through-flow, pressure or a physical value to be derived from that group. The pump open-loop or closed-loop control device is configured to control an operation of the pump to adjust the delivery output of the pump
(Continued)

system depending on the degree of opening of the throttle device.

11 Claims, 1 Drawing Sheet

(51) Int. Cl.
    *B29C 45/78* (2006.01)
    *B29C 45/73* (2006.01)
    *B29C 45/72* (2006.01)

(52) U.S. Cl.
    CPC .......... *B29C 45/7306* (2013.01); *B29C 45/78* (2013.01); *B29C 2945/76056* (2013.01); *B29C 2945/76304* (2013.01); *B29C 2945/76334* (2013.01); *B29C 2945/76545* (2013.01); *B29C 2945/76782* (2013.01); *B29C 2945/76812* (2013.01)

(56) References Cited

U.S. PATENT DOCUMENTS

| | | | | |
|---|---|---|---|---|
| 5,523,640 | A * | 6/1996 | Sparer | B29C 35/007 165/104.33 |
| 5,591,385 | A * | 1/1997 | Arai | B29C 45/768 264/328.16 |
| 6,495,804 | B2 | 12/2002 | Zahradnik | |
| 8,114,321 | B2 * | 2/2012 | Johnson | B29C 35/007 165/263 |
| 2001/0025708 | A1 | 10/2001 | Zahradnik | |
| 2011/0269084 | A1 * | 11/2011 | Ito | B29C 45/78 432/1 |
| 2013/0196015 | A1 * | 8/2013 | Metsugi | B29C 45/7306 425/144 |
| 2014/0217632 | A1 * | 8/2014 | Raschke | B29C 45/72 264/40.6 |
| 2015/0370262 | A1 | 12/2015 | Hanaoka et al. | |

FOREIGN PATENT DOCUMENTS

| | | | |
|---|---|---|---|
| DE | 10329494 B3 * | 7/2004 | ......... B29C 45/7306 |
| EP | 1 132 192 | 9/2001 | |
| EP | 2 762 290 | 8/2014 | |
| EP | 2 602 085 | 11/2015 | |
| GB | 1145990 A * | 3/1969 | .......... B29C 35/007 |
| JP | 3-230913 | 10/1991 | |
| JP | 2000-257800 | 9/2000 | |
| WO | 2014/132353 | 9/2014 | |

OTHER PUBLICATIONS

Grundfos Vertrieb: "Grundfos Industrie—Immer cool bleiben", Internet Citation, Jul. 2000 (Jul. 2000), pp. 1-4, XP002722690, English Abstract Only.
Search Report dated Sep. 12, 2016 in Austrian Application No. A 51020/2015, with English translation.
Wittmann Battenfeld realisiert ein Vorzeigeprojekt, Gesamtlösungen, Wittman innovations, Apr. 2014.
Temperiergeräte Fa. Wittmann Pressemitteilung Jul. 25, 2014 Type: TEMPRO primus C120 und TEMPRO basic C120.
Durchflussregler Fa. Wittmann Pressemitteilung Oct. 2, 2013 Type: Flowcon plus.
Regloglas Frequenzumrichter für Temperiergeräte—Fakuma 2012.
Temperierung, WITTMAN Innovations, Apr. 2013.
Wittmann, K-Planer, 2013.
Wittmann, Durchflussregler für kalte Anwendungen, Kunststoffe 2014.
Wittmann, Österreichische Kunststoffzeitschrift, 2014.
Wittmann, Plasticker, 2014.

* cited by examiner

TEMPERATURE CONTROL APPARATUS

BACKGROUND OF THE INVENTION

The present invention concerns a temperature control apparatus for a shaping tool or components of a shaping working machine, a shaping working machine having such a temperature control apparatus, and a method of temperature control of a shaping tool or components of a shaping working machine.

The following discussion of the state of the art is set out by way of example on the basis of an injection molding machine as a special case of a shaping working machine, and on the basis of an injection molding tool of such an injection molding machine as an example of a shaping tool of a general shaping working machine. The disclosure of the following application is, however, not limited to that special case.

The term temperature control is used in the present application to denote cooling or heating.

In the state of the art, the at least one pump is operated with a constant delivery output or in rotary speed-controlled fashion. Either the quantitative through-flow occurring due to the delivery output (delivery amount or pressure and so forth) and the hydraulic resistance of the at least one branch line is used or throttles are employed to achieve a desired lower quantitative through-flow.

When using a pump with a constant delivery output, various disadvantages arise. In particular, there is a constantly high energy consumption, —a reduced service life of the pump system, a cost involved in reverse temperature control of the temperature control medium by virtue of an excessively high volume flow, higher leakage susceptibility, and unnecessarily high pressure in the temperature control system.

When using a rotary speed-controlled pump, it is not easy to set the optimum operating point of the pump (in terms of the energy involved), especially when using a plurality of temperature control branches. In particular, it is not each to set an optimum operating point when the pumps are provided with throttle devices.

SUMMARY OF THE INVENTION

The object of the invention is to at least partially overcome the above-described disadvantages.

That object is attained by a temperature control apparatus, a shaping working machine having such a temperature control apparatus, and a method as described below.

The invention makes it possible to operate the temperature control apparatus at the optimum operating point (in terms of energy).

A setting value is predetermined for the throttle open-loop or closed-loop control device, depending on a control variable (for example, a given quantitative through-flow in the at least one temperature control branch, a given pressure in the at least one temperature control branch, a temperature to be reached in the article to be subjected to temperature control, or a temperature difference in respect of the temperature control medium between a feed and the return of the at least one temperature control branch). Depending on that control variable, the throttle open-loop or closed-loop control device predetermines the degree of opening of the throttle device. The instantaneous degree of opening (target value or, if a suitable measuring device is present, the actual value) is used to set or predetermine the delivery output of the pump system. A variation in that delivery output acts as a disturbance value on the throttle open-loop or closed-loop control device, which is compensated for by the throttle open-loop or closed-loop control device.

If, for example, the degree of opening is below a predetermined value (preferably 80-100%, that is to say almost completely or completely open), the delivery output of the pump system is reduced. In that way, the quantitative through-flow is reduced (which here is selected as the control variable for the throttle open-loop or closed-loop control device, alternatively—as stated above—it would also be possible to use other control variables), and the throttle open-loop or closed-loop control device increases the degree of opening of the throttle device. If the degree of opening is still below the predetermined value for the degree of opening, the delivery output of the pump system is further reduced. That takes place until the predetermined value for the degree of opening of the throttle device is reached or exceeded (in the case of a plurality of throttle devices: until the predetermined value is reached or exceeded by one of the throttle devices). If, more specifically, the predetermined value for the degree of opening of the throttle device is reached or exceeded, but the delivery output of the pump system is too low for a required quantitative through-flow, the delivery output of the pump system is increased until the required quantitative through-flow occurs.

This affords an optimum working point in respect of the overall system comprising the pump system and the throttle device with minimized hydraulic resistance with at the same time minimal energy consumption on the part of the pump system.

Instead of only one predetermined value for the degree of opening of the throttle device, it is also possible to predetermine a minimum and a maximum value so as to provide a control band.

Setting of the delivery output of the pump system can be effected in various ways.

For example, a machine control device of the shaping working machine can communicate a suitable open-loop or closed-loop control signal to the pump system, using the degree of opening of the throttle device. The pump system itself (or another open-loop or closed-loop control means present outside the shaping working machine) can have a pump open-loop or pump closed-loop control device which, depending on the degree of opening of the throttle device, communicates a suitable open-loop or closed-loop control signal to the at least one pump of the pump system or a drive of the at least one pump of the pump system. In other words, the pump open-loop or pump closed-loop control device generates a control signal to control an operation of the pump to thereby adjust the delivery output of the pump depending on the degree of opening of the throttle device. The throttle open-loop or closed-loop control device can also itself communicate a suitable open-loop or closed-loop control command to the pump system. A user can also manually implement setting of the delivery output of the pump system, depending on a signal which indicates to him the direction of the intervention to be effected.

The temperature control medium is preferably water (gaseous or liquid) or oil. It is, however, also possible to use other fluids such as carbon dioxide or nitrogen. The temperature control medium can be delivered continuously or in pulsed fashion.

It is particularly preferable that the temperature control apparatus is in the form of a supply device for a shaping working machine, and has one or more temperature control branches. The supply device can either be arranged in a free-standing relationship beside the shaping working machine, or it can be installed thereon.

The pump open-loop or closed-loop control device can be a component part of the machine control of the shaping working machine, an external control, a supply device, or a central main computer system.

The throttle open-loop or closed-loop control device can be a component part of the machine control of the shaping working machine, an external control, a supply device, or a central main computer system.

The pump open-loop or closed-loop control device and the throttle open-loop or closed-loop control device can be in the form of a common open-loop or closed-loop control device.

The pump system can be a component part of the shaping working machine, a supply device, or a central media supply.

The degree of opening of the throttle device can be variable steplessly or in steps.

Particularly preferably, the at least one throttle device is in the form of a valve with a variable degree of opening. Particularly preferably the setting value of the at least one throttle device involves valve positions.

Particularly preferably, the at least one pump of the pump system and/or the possibly at least one throttle device which is in the form of a throttle pump is in the form of a rotary speed-controlled pump.

Particularly preferably, the quantitative through-flow or the temperature difference between the feed and the return of the at least one temperature control branch through the at least one temperature control branch is used as the open-loop or closed-loop control variable.

The pump open-loop or closed-loop control device can provide for open-loop or closed-loop control of the delivery output of the pump system depending on a maximum instantaneous degree of opening of the degrees of opening of the throttle devices, having regard to the level of efficiency of the pump system.

BRIEF DESCRIPTION OF THE DRAWINGS

Further advantages and details of the invention will be apparent from the specific description with reference to the drawings, in which.

DETAILED DESCRIPTION OF THE INVENTION

Figure 1:
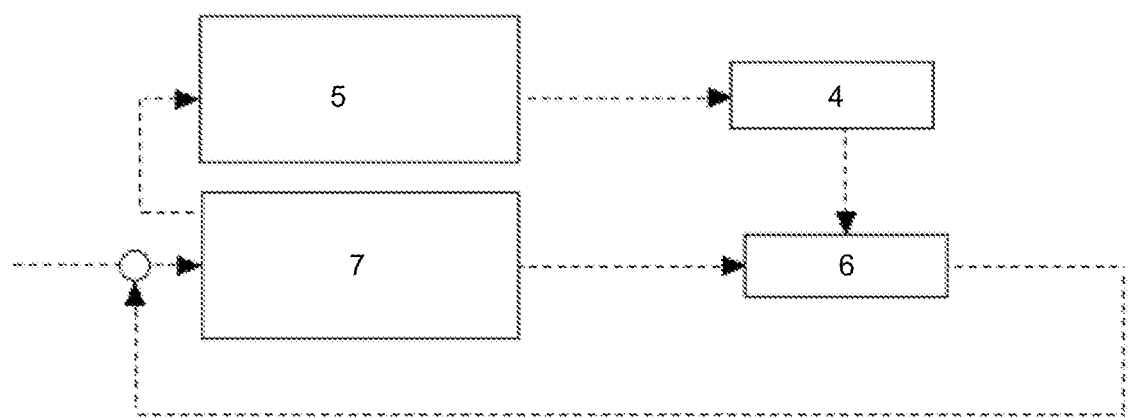
FIG. 1 is a diagrammatic view of the invention.

FIG. 1 diagrammatically shows a throttle device 6 and a throttle closed-loop control device 7 for closed-loop control of the degree of opening of the throttle device 6 and a pump system 4 having a pump closed-loop control device 5 for closed-loop control of the delivery amount of the pump system 4.

The two control circuits are connected together insofar as the instantaneous degree of opening of the throttle device 6 (as an example of a control variable) is communicated from the throttle closed-loop control device 7 to the pump closed-loop control device 5, and the instantaneous delivery amount of the pump system 4 represents a disturbance variable acting on the throttle device 6. It will be appreciated that, alternatively, the control variable can also be communicated by the throttle device 6 to the pump closed-loop control device 5.

Figure 2:
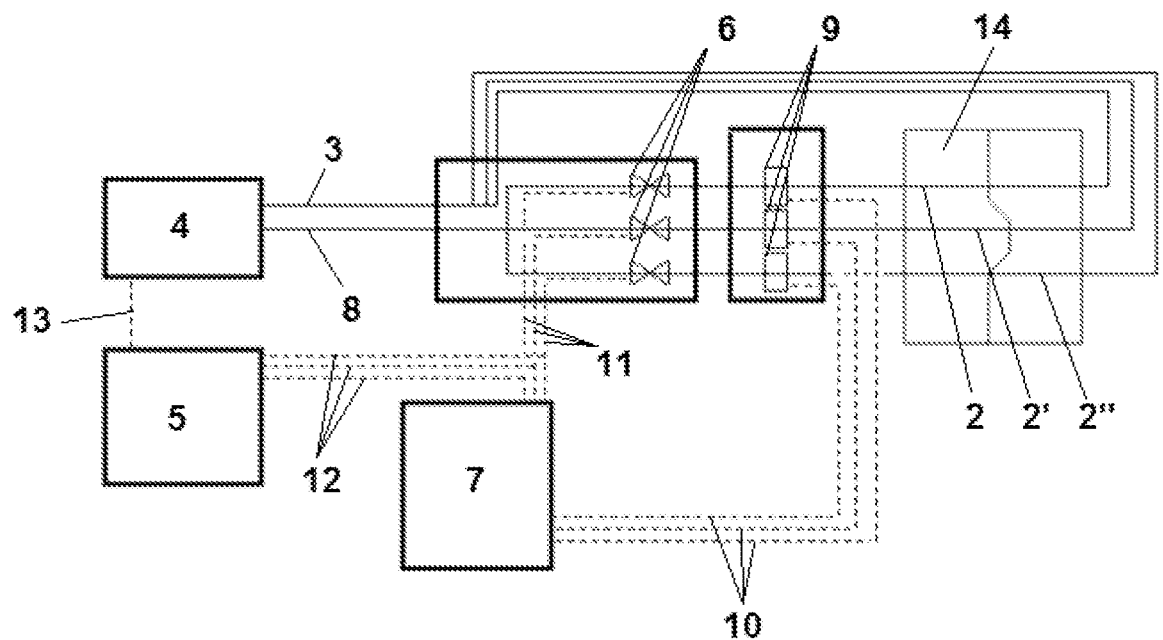
FIG. 2 shows an embodiment by way of example of a temperature control apparatus according to the invention.

FIG. 2 shows a temperature control apparatus 1 for a shaping tool 14 of a shaping working machine (not shown in greater detail). The temperature control apparatus can include, for example, three temperature control branches 2, 2', 2" (the number of temperature control branches 2, 2', 2" is naturally not to be interpreted as limitative).

The temperature control branches 2, 2', 2" are connected to a feed 3 and a return 8.

There is a pump system 4 including at least one rotary speed-controlled pump for conveying temperature control medium in the feed 3, the delivery output of which can be subjected to open-loop or closed-loop control by a pump open-loop or closed-loop control device 5.

For each of the illustrated temperature control branches 2, 2', 2", there is a throttle device 6 having a variable degree of opening (here, in the form of valves). As a result of the varying degree of opening of the throttle device 6, the quantitative through-flow of the temperature control medium in the respective temperature control branch 2, 2', 2" can be throttled. The degrees of opening of the throttle devices 6 are subjected to open-loop or closed-loop control by a throttle open-loop or closed-loop control device 7. The quantitative through-flow can be measured by sensors 9, and the measured values can be fed to the throttle open-loop or closed-loop control device 7 by signal lines 10. By signal lines 11, the throttle open-loop or closed-loop control device 7 can set the degree of opening of the individual throttle devices 6. The individual degrees of opening of the throttle devices 6 are fed to the pump open-loop or closed-loop control device 5 by signal lines 12. The pump open-loop or closed-loop control device 5 can adjust the delivery output of the pump system 4 by the signal line 13. In other words, the pump open-loop or pump closed-loop control device 5 provides a control signal to the pump system 4 via the signal line 13 to control an operation of the pump(s) of pump system 4 to thereby adjust the delivery output of the pump(s) depending on the degree of opening of the throttle device(s) 6 received via the signal lines 12.

The signal lines 10, 11, 12 and 13 are to be interpreted only as an example, and any kind of data transmission is possible.

As long as the degrees of opening of all throttle devices 6 are below a fixed value, the rotary speed of the pump of the pump system 4 is reduced. Due to the reduction in the rotary speed, the quantitative through-flow rates are reduced, and the throttle open-loop or closed-loop control device 7 reacts with a stepwise opening of the throttle devices 6. The pump open-loop or closed-loop control device 5 now again reacts to the fresh degrees of opening to adjust the operation of the pump system 4 until the predetermined value is reached or exceeded by one of the throttle devices 6. In that way, an optimum working point with minimized hydraulic resistance in respect of the entire system with at the same time minimum energy consumption of the pump is reached.

The invention claimed is:

1. A temperature control apparatus for a shaping tool or components of a shaping working machine, the temperature control apparatus comprising:
    at least two temperature control branches connected to a feed for a temperature control medium,
    a pump system including a pump for conveying temperature control medium in the feed,
    a pump open-loop or closed-loop control device for open-loop or closed-loop control of a delivery output of the pump system,
    at least two throttle devices, each of the at least two throttle devices being configured to have a variable degree of opening for throttling a quantitative through-flow of the temperature control medium in a respective one of the at least two temperature control branches, and an open-loop or closed-loop control device having a degree of opening of each of the at least two throttle devices as a setting value, and having a control variable selected from a group including: the degree of opening of each of the at least two throttle devices, a temperature, a temperature difference, a through-flow, or a pressure, wherein the pump open-loop or closed-loop control device is configured to control an operation of the pump so as to adjust the delivery output of the pump system depending on a control signal indicating the degree of opening of each of the at least two throttle devices.

2. The temperature control apparatus as set forth in claim 1, wherein each of the at least two throttle devices is a valve.

3. The temperature control apparatus as set forth in claim 1, wherein each of the at least two throttle devices is a pump separate from the pump system.

4. The temperature control apparatus as set forth in claim 1, wherein the pump system further includes a motor for driving the pump.

5. The temperature control apparatus as set forth in claim 1, wherein each of the at least two throttle devices is a throttle pump separate from the pump system, and the pump of the pump system and/or the throttle pump is a rotary speed-controlled pump.

6. The temperature control apparatus as set forth in claim 1, wherein an overall control system is in the form of cascaded control elements, wherein an outer control element is the pump open-loop or closed-loop control device, and an inner control element is values from a group consisting of the degree of opening of each of the at least two throttle devices, a temperature, a temperature difference, a through-flow, or a pressure.

7. The temperature control apparatus as set forth in claim 1, wherein the pump open-loop or closed-loop control device is configured to control the operation of the pump to adjust the delivery output of the pump system depending on a maximum instantaneous degree of opening of the degrees of opening of each of the at least two throttle devices.

8. The temperature control apparatus as set forth in claim 7, wherein the pump open-loop or closed-loop control device is configured to control the operation of the pump to adjust the delivery output of the pump system depending on a maximum instantaneous degree of opening of the degrees of opening of each of the at least two throttle devices having regard to an efficiency of the pump system.

9. A shaping working machine comprising the temperature control apparatus as set forth in claim 1.

10. A method of temperature control of a shaping tool or components of a shaping working machine, said method comprising:

providing at least two temperature control branches connected to a feed for a temperature control medium, providing a pump system including a pump for delivery of the temperature control medium in the feed, providing at least two throttle devices, each of the at least two throttle devices having a variable degree of opening for throttling a quantitative through-flow of the temperature control medium in a respective one of the at least two temperature control branches, and controlling an operation of the pump of the pump system to adjust a delivery output of the pump system depending on the degree of opening of each of the at least two throttle devices, the controlling being closed-loop control.

11. The shaping working machine of claim 9, wherein the shaping working machine is one of an injection molding machine, a pressure die casting machine, or a pressing machine.

* * * * *